(12) United States Patent
Thompson et al.

(10) Patent No.: US 9,056,627 B2
(45) Date of Patent: Jun. 16, 2015

(54) STEERING COLUMN ASSEMBLY

(75) Inventors: Carl Thompson, Coventry (GB); Niclas Davies, Swansea (GB)

(73) Assignee: TRW Limited, West Midlands (GB)

( * ) Notice: Subject to any disclaimer, the term of this patent is extended or adjusted under 35 U.S.C. 154(b) by 668 days.

(21) Appl. No.: 12/669,606

(22) PCT Filed: Jul. 11, 2008

(86) PCT No.: PCT/GB2008/002374
§ 371 (c)(1),
(2), (4) Date: Jun. 2, 2010

(87) PCT Pub. No.: WO2009/013457
PCT Pub. Date: Jan. 29, 2009

(65) Prior Publication Data
US 2010/0242664 A1 Sep. 30, 2010

(30) Foreign Application Priority Data
Jul. 20, 2007 (GB) .................................. 0714161.7

(51) Int. Cl.
*B62D 1/184* (2006.01)
*B62D 1/185* (2006.01)

(52) U.S. Cl.
CPC ............ *B62D 1/184* (2013.01); *Y10T 29/49622* (2015.01); *B62D 1/185* (2013.01)

(58) Field of Classification Search
CPC .................................. B62D 1/184; B62D 1/185
USPC .............................. 74/492, 493; 280/775–777
See application file for complete search history.

(56) References Cited

U.S. PATENT DOCUMENTS

| 3,801,207 | A | * | 4/1974 | Herbenar et al. | 403/46 |
| 4,438,960 | A | * | 3/1984 | Carroll et al. | 285/367 |
| 5,678,454 | A | * | 10/1997 | Cartwright et al. | 74/493 |
| 6,357,318 | B1 | * | 3/2002 | Koellisch et al. | 74/493 |
| 6,467,807 | B2 | * | 10/2002 | Ikeda et al. | 280/775 |

(Continued)

FOREIGN PATENT DOCUMENTS

| DE | 19840426 A1 | 3/1999 |
| EP | 1529714 A2 | 5/2005 |

(Continued)

OTHER PUBLICATIONS

International Search Report for International Application No. PCT/GB2008/002374 dated Oct. 17, 2008.

*Primary Examiner* — William Kelleher
*Assistant Examiner* — Emily Cheng
(74) *Attorney, Agent, or Firm* — MacMillan, Sobanski & Todd, LLC

(57) ABSTRACT

A steering column assembly comprises inner and outer tubes, an elongate slot in the outer tube closed by applying a load to either side of the slot to reduce the internal diameter of the tube, a pair of flanges fixed to the tube on opposing sides of the slot, and a clamp mechanism which connects one flange to the other, the clamp mechanism movable between a clamped position which applies a clamping force to the flanges to reduce the slot width and tighten the outer tube around the inner tube, and an unclamped position which permits the flanges to move away from one another, and a catch secured at one end to one of the flanges and catches a part of the other flange at its other end, to prevent movement of the flanges beyond a position wherein the inner diameter of the outer tube is equal to a predetermined maximum value.

13 Claims, 2 Drawing Sheets

(56) References Cited

U.S. PATENT DOCUMENTS

| | | | |
|---|---|---|---|
| 7,316,138 B2* | 1/2008 | Goshima et al. | 70/186 |
| 7,322,608 B2* | 1/2008 | Yamamoto et al. | 280/775 |
| 7,347,454 B2* | 3/2008 | Martus | 285/23 |
| 7,914,043 B2* | 3/2011 | Olgren et al. | 280/775 |
| 2002/0023515 A1* | 2/2002 | Kuroumaru et al. | 74/493 |
| 2003/0000330 A1 | 1/2003 | Murakami et al. | |
| 2004/0251672 A1* | 12/2004 | Lee | 280/775 |
| 2005/0093283 A1 | 5/2005 | Yamada | |
| 2006/0207378 A1* | 9/2006 | Kramer et al. | 74/492 |
| 2007/0068311 A1* | 3/2007 | Shimoda et al. | 74/493 |

FOREIGN PATENT DOCUMENTS

| | | |
|---|---|---|
| JP | 2006096180 A | 4/2006 |
| JP | 2007091118 A | 4/2007 |
| WO | 2007026114 A1 | 3/2007 |

* cited by examiner

STEERING COLUMN ASSEMBLY

CROSS-REFERENCE TO RELATED APPLICATIONS

This application is a national stage of International Application No. PCT/GB2008/002374 filed Jul. 11, 2008, the disclosures of which are incorporated herein by reference in entirety, and which claimed priority to Great Britain Patent Application No. 0714161.7 filed Jul. 20, 2007, the disclosures of which are incorporated herein by reference in entirety.

BACKGROUND OF THE INVENTION

This invention relates to improvements in steering column assemblies. It also relates to a method of assembling a steering column assembly.

Steering columns for vehicles, such as cars, are increasingly required to have the ability to change length. With the prevalence of airbags, it is important that the wheel is not placed too close to a driver nor too far away. Allowing the length to be adjusted allows the driver to set the correct "reach" of the steering column. The requirement for a change in length is also important in a crash, as the column should be able to collapse under impact to reduce the forces on the driver's chest if it strikes the steering wheel.

One of the simplest ways to achieve the required length adjustment is to provide a two-part column that comprises an inner tube and an outer tube with the inner tube being able to slide within the outer in the manner of a traditional telescope. These assemblies are known as tube-in-tube steering columns. A typical tube in tube column assembly is shown in FIG. 1 of the accompanying drawings; whilst this shows part of an electric power assisted steering system, the invention itself is not so limited. The inner and outer tubes define a shroud which sits around, supports and protects a collapsible steering shaft that is connected to the steering wheel of the vehicle.

Where a column assembly of the kind shown in FIG. 1 is adjustable for reach and or rake (up and down movement) the outer tube must be held rigidly by a releasable clamp mechanism to a column support bracket that is fixed to the vehicle body structure. Ideally, the clamp system would lock the outer tube in place and simultaneously cause the outer tube to grip the inner tube. The benefits of this would be: (a) to maximise the bending stiffness of the total column assembly in the clamped position and (b) to ensure there is a predictable amount of sliding friction between the inner and outer tubes, in the clamped condition, which can contribute a specified proportion of the total energy-absorbing crash force required in a crash, and (c) in cases where reach adjustment is to be provided, to allow the inner and outer tube to freely slide in an unclamped condition.

Clamping a continuous cylindrical outer tube onto an inner tube requires a high clamp force (a tube naturally does not easily compress without unwanted buckling), so to reduce the force needed it is known to provide an elongate slot in the outer tube. A pair of flanges is provided, one on each side of the slot. The flanges can be forced together by a suitable clamp mechanism when in the clamped position to at least partially close the edges of the slot together. A clamp mechanism that includes a clamp pin that passes through the flanges has been proposed to provide this load to the flanges.

The applicant has appreciated that a potential problem with such a steering column assembly is that when unclamped the amount of free play between the inner and outer tubes is hard to control. The inner diameter of the outer tube is not always consistent between samples, deformation often occurring during machining of the slot into the tube. Past attempts to compensate for this have involved complex arrangements of lock nuts on each end of the clamp pin used to hold the flanges together. The clamp mechanism itself when unclamped can therefore control how far the flanges can be allowed to spread apart and provide some pre-load to the flanges. Whilst these designs can be effective, they do require careful set up and can be easily knocked out from the optimal set up over time.

BRIEF SUMMARY OF THE INVENTION

According to a first aspect, the invention provides a steering column assembly comprising:
an inner tube and an outer tube that surrounds the inner tube along at least part of its length, in a relaxed condition the outer tube being a relatively loose fit around the inner tube,
an elongate slot in the outer tube which can be at least partially closed by applying a load either side of the slot to cause a reduction in the internal diameter of the tube,
a pair of flanges which are fixed to the tube on opposing sides of the slot, and
a clamp mechanism which connects one flange to the other, the clamp mechanism being movable between a clamped position in which it applies a clamping force to the flanges that acts to reduce the width of the slot and so tightens the outer tube around the inner tube, and an unclamped position in which the clamping force is reduced to permit the flanges to move away from one another as the tube returns towards its relaxed condition,
and further comprising a catch which is secured at one end to one of the flanges and catches a part of the other flange at its other end, the catch preventing movement of the flanges beyond a position in which the inner diameter of the outer tube is equal to a predetermined maximum value.

The provision of a catch that limits how far the tube inner diameter can open out in the unclamped position allows the free play between the inner and outer tubes to be carefully controlled.

The catch may comprise a hooked fastener, which may comprise a hook which is secured at one end to one flange and hooks onto a side of a slot in the other flange when in the unclamped position, in the clamped position the hook moving clear of the side of the slot. This hook therefore limits the amount of opening of the outer tube and does not impede the movement of the flanges towards one another during clamping.

The hook may be welded to one flange or fixed by some other suitable means. Welding is preferred as it allows, within reason, an infinite amount of fine adjustment in position to be made on assembly.

Alternatively, it may comprise a tie bar such as a rod or bolt which engages a threaded opening in one flange and passes through an un-threaded opening in the other. The end that is not threaded to a flange could be provided with a head or adjustable nut.

It could comprise a two ended bolt or rod which passes through unthreaded openings in each flange. One end of the bolt may be provided with a head or nut, and the other with a nut. The nut(s) may be adjusted with the spacing between the head/nut setting the spacing between the flanges As with the hook, the tie bar controls how far the flanges can move apart and it must allow relatively free movement of the flanges from the unclamped to the clamped position.

The flanges may comprise upwardly extending generally vertical walls that each include an elongate slot, an inwardly turned end portion of the flange providing connection for one end of the hook, and on the other flange the slot that receives the hook. The catch may fasten together one end of the flanges. It may be located wholly between the flanges.

The flanges are preferably located above the centre line of the outer tube and the hook may be located between the vertical walls.

The clamp mechanism may comprise a clamp pin that passes between the elongate slots in the two flanges. The elongate slots allow the outer tube to adjust for reach relative to the clamp pin. One end of the clamp pin may be provided with a captive nut or fixed head, and the other may be provided with a cam mechanism that is prevented from leaving the pin by a further nut or head. The cam mechanism may be operated by a lever.

A support bracket may be provided which is secured to a fixed part of a vehicle body structure. This may comprise an inverted u-shaped bracket, and the clamp pin may pass through openings in the dependent arms of the bracket. These arms may lies outside of each vertical wall of the flanges. When clamped the clamp mechanism may press the arms onto the vertical walls of the bracket simultaneous with clamping the outer tube to the inner tube. In this arrangement, excessive expansion of the outer tube that may otherwise arise if the catch was not present could make rake adjustment difficult due to friction between the outer faces of the flanges and the inner faces of the bracket arms as the bracket tries to restrain the expansion.

The inner and outer tubes may accommodate a two part collapsible steering shaft. This may be located by one or more bearings journaled to the inner tube and/or outer tube.

The elongate slot may be aligned with the centre line of the outer tube, although this is not essential. It may, for example, spiral around the outer tube. All that is required is that as loading the flanges closes up the slot, the inner diameter of the tubes will reduce.

Also, whilst the invention is described in terms of tube, these need not have perfectly cylindrical cross-sections. The inner and outer tubes may, for example, be ovalised.

The openings in the u-shaped bracket may be slightly larger than the diameter of the pin. Alternatively, the openings may comprise generally elongate slots, the clamp pin being free to move up and down the slots when in the unclamped position to permit rake adjustment of the steering column.

It will be appreciated that the successful operation of the steering column assembly of the invention depends on the correct setting of the catch. If it is in the wrong place, it may not allow the flanges to move far enough apart, making it hard to slide the inner tube within the outer tube even when unclamped. One the other hand it may allow the outer tube to open too much which would introduce unwanted lateral play between the inner and outer tubes, giving a poor feel to the assembly when adjusting.

Therefore, according to a second aspect the invention provides a method of assembling a steering column assembly according to the first aspect of the invention, the method comprising the steps of:

placing the outer tube round a mandrel having a known outer diameter corresponding to the predetermined inner diameter of the outer tube required in the unclamped position, clamping the outer tube to the mandrel so that the inner diameter of the outer tube matches the outer diameter of the mandrel, positioning the catch in the slot in the one flange so that it contacts the side of the slot and also contacts the other flange, and securing the catch to other flange by welding or such like so that there is no slack between the hook and the side of the slot.

The method may then comprise releasing the outer tube from the mandrel, and inserting the inner tube. This subassembly can then be fitted with the clamp mechanism. The clamp mechanism does not have to be adjusted to set the unclamped diameter of the outer tube—it is preset by the catch.

In a modification, rather than the clamping round a mandrel the flanges may be clamped together and the inner diameter of the outer tube measured, the catch being set when the inner diameter is at the predetermined value. An adjustable clamp would therefore be needed to load the flanges prior to and during fixing of the catch. It would have the advantage that the clamp could easily be released after the catch is fitted (compared with removing the mandrel). In a still further modification, a collar could be fitted around the outside of the outer tube during assembly to set the inner diameter to the predetermined value.

It will be appreciated that due to variations in outer tube diameter between samples, the outer tube may or may not be under load in the unclamped position. In the event that it is under load, the catch should be so constructed that it can take the required load without loosening over time.

Other advantages of this invention will become apparent to those skilled in the art from the following detailed description of the preferred embodiments, when read in light of the accompanying drawings.

DETAILED DESCRIPTION OF THE INVENTION

Figure 1:
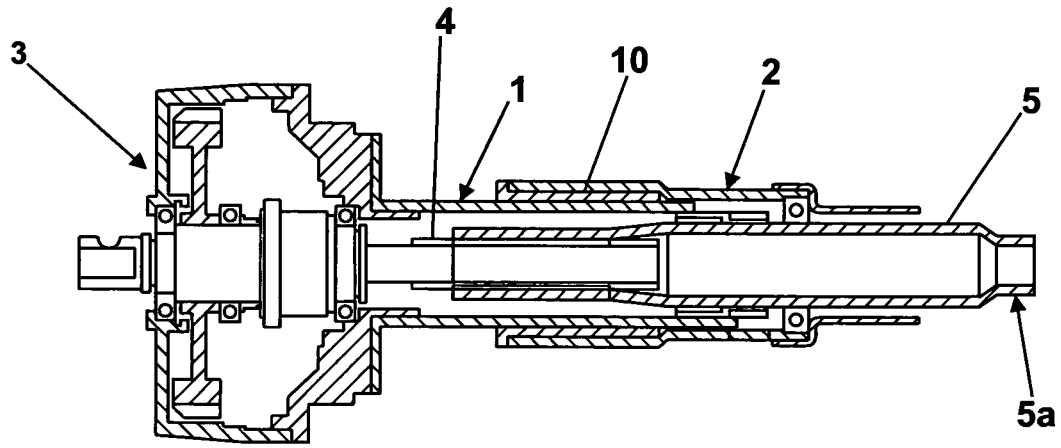
FIG. 1 is a cross sectional side view of a steering column assembly.

A steering column assembly comprises an inner tube 1, which is a sliding fit within an outer tube 2. One end of the inner tube connects to a gearbox housing 3 for an electric power steering system, although this is optional. The gearbox housing 3 is fixed to a part of the vehicle body structure so that the column can pivot to allow for rake adjustment.

Within the inner and outer tubes is a two part, telescopic, steering shaft comprising upper and lower shaft portions 4, 5. This connects to the gearbox at one end and to a steering wheel (not shown) at its other end 5a. It can also collapse in the event of a crash, or to follow sliding movement of the inner and outer tubes. This provides some reach adjustment to the steering wheel.

To permit the outer tube 2 to grip the inner tube 1, it is provided with an elongate slot 7 that is aligned with the centre line 2a of the outer tube 2. On each side of the slot 7 is a flange 8, 9. As will be described, the flanges 8,9 can be forced together to cause the slot 7 partially to close up. This reduces the effective internal diameter of the outer tube 2 until it grips the inner tube 1. An intermediate shim or collar 10 can be located between the inner and outer tubes, and the outer tube will grip the inner tube through this shim.

Figure 2:
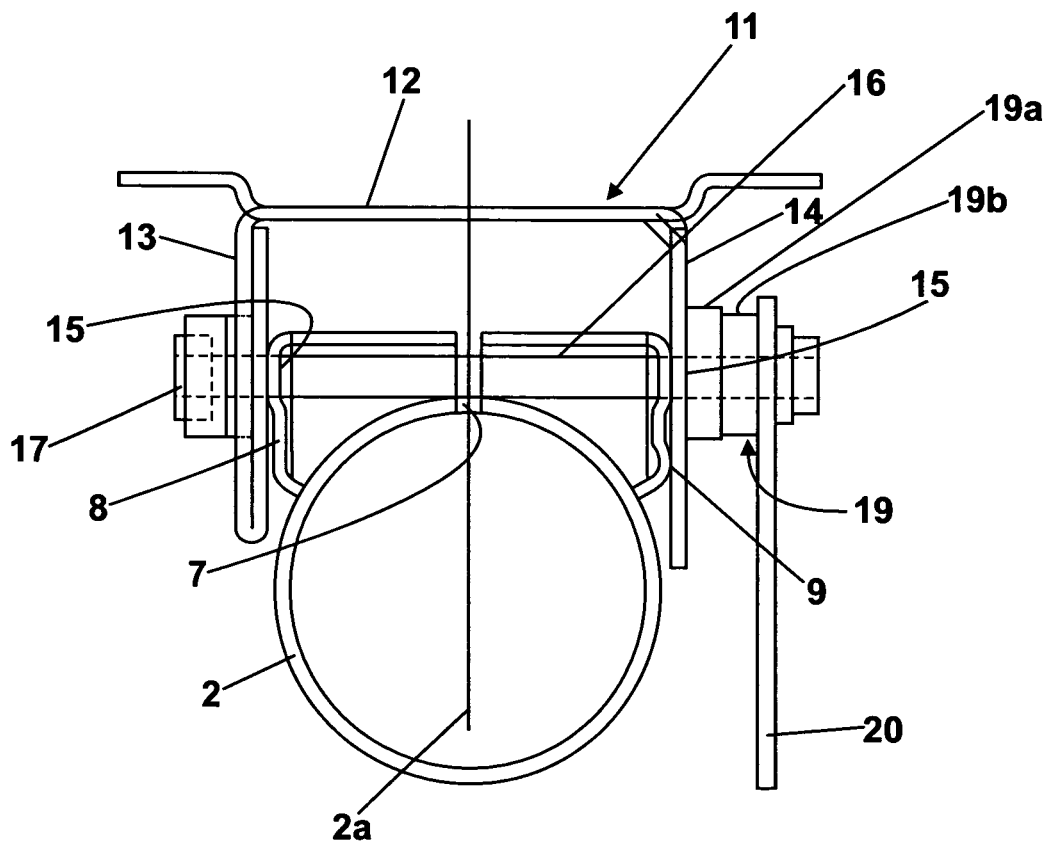
FIG. 2 is a cross sectional view in elevation of a part of a clamp assembly in accordance with the present invention that can be included in the steering assembly of FIG. 1.

FIG. 2 shows how the outer tube 2 is fixed to the vehicle structure. A u-shaped bracket 11 is secured to a fixed part of the vehicle. The centre line of the outer tube 2 is located below the centre line of the bracket 11, with the flanges 8, 9 extending vertically upwards towards the base 12 of the bracket 11. The downwardly depending arms 13, 14 of the u-shaped bracket 11 are positioned so that they lie outside of, and with their inner faces in contact with, the outer faces of the vertical flanges 8, 9.

Both the flanges 8, 9 and the depending arms 13, 14 of the bracket 11 are provided with slots 15 and a clamp mechanism including a clamp pin 16 (shown in FIG. 2 only) passes through the slots 15 in the arms 13, 14 and the flanges 8, 9. The outer tube 2 can therefore hang from the pin 16, which is held up by the arms of the bracket 11. Lateral movement of the outer tube is prevented by interaction between the arms of the bracket and the flanges.

One end of the clamp pin 16 is provided with a nut or head 17 that is located outside of the adjacent arm 13 of the u-shaped bracket and is dimensioned so that it cannot be pulled through the slot 15 in the bracket arm by pulling on the clamp pin 16. The other end of the pin 16 is also provided with a nut 18. A cam mechanism 19 is provided between the nut and the outer face of the adjacent arm of the bracket. It comprises a cam race 19a having dogs engaging with the vertical slot 15 in the arm 14 so it cannot rotate, and a cam follower 19b that can rotate around the pins axis. A handle, in the form of a lever 20 is provided which enables a driver to rotate the cam follower 19b of the cam mechanism. This movement varies the length of the cam mechanism 19 (when measured along the axis of the pin). When the cam mechanism is at its shortest length, the arms of the bracket rest in an unstrained position. When it is at its longest length, the arms of the bracket are clamped onto the vertical flanges, which in turn apply a load to each side of the slot in the outer tube. The load causes the slot 7 to close up, at least partially, and the outer tube 2 clamps to the inner tube 1.

Figure 3:
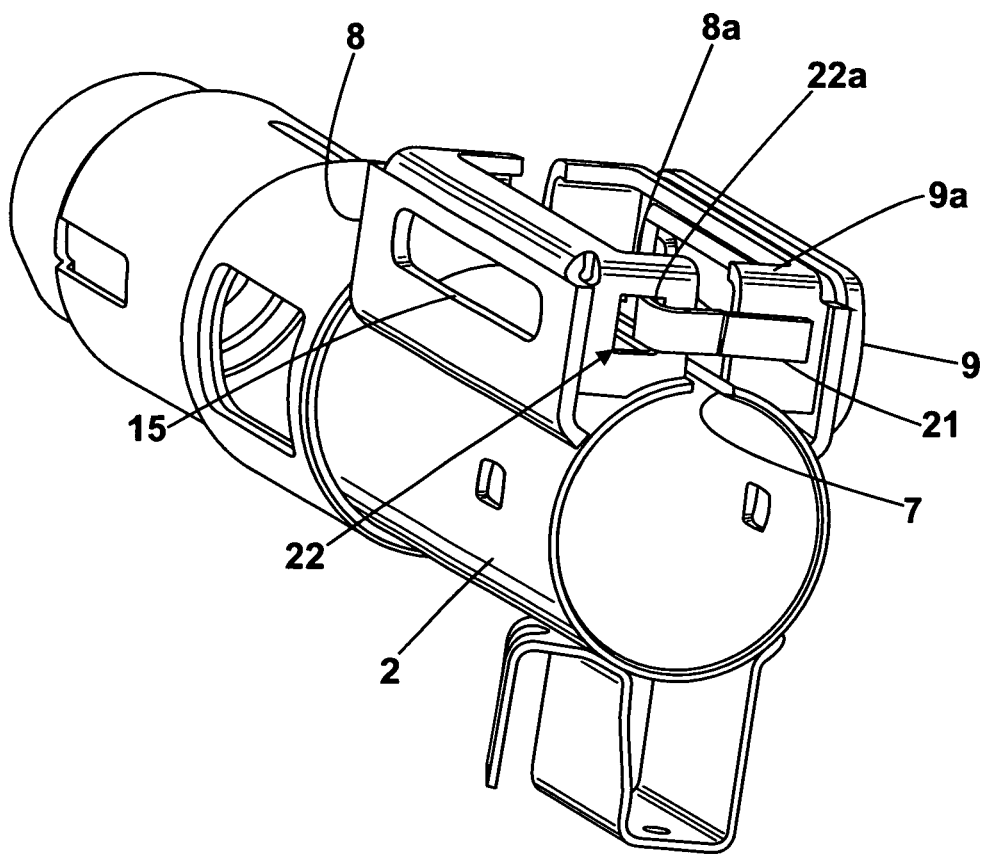
FIG. 3 is a perspective view of a section of the steering assembly with the clamp pin and its clamp mechanism removed for clarity.

As shown in FIG. 3, end portions 8a, 9a of the vertical flanges 8, 9 are turned in through 90 degrees towards one another, although not so far that they meet even when fully clamped. A catch 21 is secured to one of the inwardly turned end portions 9a by welds, and has a hook at its other end which fits into a slot 22 in the other inwardly turned end portion 8a. The catch 21 as shown in the example is a simple element formed by bending a flat bar of metal to form a base and a hooked end. When in the unclamped position, the hook engages a side 22a of the slot facing the other flange and this prevents the two flanges moving any further apart. When the clamp mechanism moves to the clamped position the hook moves free of the side of the slot and moves towards the other side of the slot (but does not reach it). The hook therefore does not interfere with the clamping movement of the clamp mechanism.

The catch 22 is positioned so that when the clamp mechanism is released, even if to a point where it applies no clamp load to the arms 13, 14 of the u-shaped bracket, the inner diameter of the outer tube 2 is unable to exceed a predetermined level. This is possible because the catch controls how far apart the flanges can move, and hence how much the slot in the outer tube 2 can open up. This diameter can be chosen so that it is only slightly larger than the outer diameter of the inner tube. This ensures they can slide freely but that there is not excessive lateral free play when unclamped.

Because the inner tube 1 in the example is rigid (it does not have a slot), most of the variations between samples are due to changes in the inner diameter of the outer tube 2. The predetermined inner diameter of the outer tube could therefore be set at a constant value and in most cases this will suit the actual outer diameter of most inner tube samples.

The catch 22 can therefore be welded in position on the outer tube whilst it is clamped onto a mandrel of known outer diameter. It can first be offered up so it contacts the sidewall of the slot, and then welded in place. The mandrel can then be removed. This can be achieved either by using a collapsible mandrel, or by incorporating a bit of give in the catch 22 that can be overcome through the application of a suitable load. Of course, the catch 22 should be stiff enough to prevent the outer tube flanges moving away from one another in normal use, i.e. simply due to the tube trying to relax back to its rest position.

Several modifications are possible within the scope of the invention. For example, whilst the embodiment shows the outer tube attached to a gearbox the arrangement could be inverted with the outer tube attached to the gearbox housing and the inner extending towards the steering wheel. Again, it is still the outer tube that will be split and clamps onto the inner tube.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
    an inner tube having a length and an outer tube that surrounds said inner tube along at least part of the length thereof, in a relaxed condition said outer tube being a relatively loose fit around said inner tube,
    an elongate slot in said outer tube which can be at least partially closed by applying a load to either side of said slot to cause a reduction in an internal diameter of said outer tube,
    a pair of flanges which are fixed to said outer tube on opposing sides of said slot,
    a clamp mechanism which connects a first one of said pair of flanges to a second one of said pair of flanges, said clamp mechanism being movable between a clamped position in which said clamp mechanism applies a clamping force to said pair of flanges that acts to reduce a width of said slot and so tightens said outer tube around said inner tube, and an unclamped position in which said clamping force is reduced to permit said pair of flanges to move away from one another as said outer tube returns towards said relaxed condition,
    and a catch which is a separate and distinct component relative to said pair of flanges, said catch being fixedly secured at a first end to one of said pair of flanges and non-fixedly secured at a second end to the other one of said pair of flanges to catch a part of the other one of said pair of flanges at the second end thereof, wherein an inner diameter of the outer tube is larger than an outer diameter of the inner tube when the clamp mechanism is in the unclamped position so that there is limited lateral free play between the inner and outer tubes,
    wherein said clamp mechanism includes a clamp pin that passes between an elongate slot provided in each of said pair of flanges,
    wherein a support bracket is provided which is secured to a fixed part of a vehicle body structure, wherein said support bracket comprises an inverted u-shaped bracket having two dependent arms, and said clamp pin passes through openings in said dependent arms of said support bracket, wherein in the clamped position, said clamp mechanism presses said dependent arms onto said support bracket simultaneous with clamping said outer tube to said inner tube, and wherein in the unclamped position, said catch restrains expansion of the outer tube relative to the inner tube to prevent an increase in friction between an outer face of said flanges and an inner face of said dependent arms of the bracket.

2. The steering column assembly of claim 1, wherein said catch comprises a hooked fastener, which is secured at said one end to said one of said pair of flanges and hooks onto a side of a slot in said other one of said pair of flanges when in said unclamped position, wherein in said clamped position said hooked fastener moves clear of the side of said slot.

3. The steering column assembly of claim 2, wherein said hooked fastener is welded to said one of said pair of flanges.

4. The steering column assembly of claim 2 wherein said pair of flanges comprise upwardly extending generally vertical walls that each include an elongate slot, an inwardly turned end portion of said one of said pair of flanges providing connection for one end of said hooked fastener, and on the other one of said pair of flanges the slot that receives said hooked fastener.

5. The steering column assembly of claim 4, wherein said catch fastens together one end of said pair of flanges.

6. The steering column assembly of claim 5, wherein said catch is located wholly between said pair of flanges.

7. The steering column assembly of claim 1, wherein one end of said clamp pin is provided with one of a captive nut and a fixed head, and the other end is provided with a cam mechanism that is prevented from leaving said pin by a further one of a nut and a head.

8. The steering column assembly of claim 1 wherein said inner tube and said outer tube accommodate a two part collapsible steering shaft.

9. The steering column assembly of claim 1 wherein said elongate slot is aligned with a centre line of said outer tube.

10. The steering column assembly of claim 1 wherein said openings in said u-shaped bracket are larger than a diameter of said clamp pin.

11. The steering column assembly of claim 1, wherein said openings comprise generally vertical elongate slots, said clamp pin being free to move up and down said slots when in said unclamped position to permit rake adjustment of said steering column.

12. The steering column assembly of claim 1, wherein each of said pair of flanges including an inwardly turned end portion, said end portions extending toward one another but not meeting.

13. The steering assembly of claim 12, wherein said catch is fixedly secured to one of said inwardly turned end portions of one of said pair of flanges and non-fixedly secured to the other one of said inwardly turned end portions of the other one of said pair of flanges to catch a part of the other one of said inwardly turned end portions.

\* \* \* \* \*